United States Patent [19]
Ishikawa

[11] Patent Number: 5,540,408
[45] Date of Patent: Jul. 30, 1996

[54] DRAG UNIT FOR A TRIPOD HEAD

[75] Inventor: Masao Ishikawa, Saitama, Japan

[73] Assignee: Heiwa Seiki Co., Ltd., Saitama, Japan

[21] Appl. No.: 414,306

[22] Filed: Mar. 31, 1995

[51] Int. Cl.$^6$ ............................ F16M 11/12; F16D 57/00
[52] U.S. Cl. .................................. 248/178.1; 248/183.1; 192/58.43; 188/322.5; 352/243; 354/293
[58] Field of Search .................. 192/58.4, 58.41, 192/58.42, 58.43, 4 B; 188/322.5; 248/177.1, 178.1, 183.1; 352/243; 354/293

[56] References Cited

U.S. PATENT DOCUMENTS

| 3,552,699 | 1/1971 | Baker | 190/58.41 X |
| 3,822,769 | 7/1974 | O'Connor | 192/58.41 X |
| 5,389,972 | 2/1995 | Cartoni | 248/183.1 X |

*Primary Examiner*—Richard M. Lorence
*Attorney, Agent, or Firm*—Wenderoth, Lind & Ponack

[57] ABSTRACT

A drag unit of the present invention is provided with a case; a drag disc disposed in the inner portion of this case; a hollow axis supporting these case and drag disc coaxially, a pair of long holes being formed at a side of the axis; a lid of the case; viscous fluid sealed between these case and lid; and a sliding axis having a pin connected to the drag disc, the pin being inserted into the inner portion of the axis and piercing the long holes of the axis so that the pin can slide along the long holes. Either of the case or the drag disc is connected to a tripod head so as to rotate with rotation of the tripod head. A plurality of first projections disposed coaxially are provided on an inner bottom surface of the case and a plurality of second projections provided on an bottom surface of the drag disc. These projections are engagable with each other.

3 Claims, 4 Drawing Sheets

DRAG UNIT FOR A TRIPOD HEAD

FIELD OF THE INVENTION

The present invention relates to a drag unit for a tripod head. More particularly, it relates to a drag unit for a tripod head having a simplified structure capable of applying a drag to the tripod head during a panning and a tilting movements of a photographing device such as a camera, a video camera and a movie camera, and also capable of adjusting the size of the drag.

DESCRIPTION OF THE PRIOR ART

A tripod head has been conventionally known as a device not only for fixing a photographing device such as a camera, a video cameras and a movie camera, but also for permitting this device to be panned and tilted.

Some of the tripod heads are provided with a drag unit generating a drag during the panning and the tilting movements in order to adjust the speed of these movements.

A drag unit described in the official gazette of the Japanese Utility Model Publication No. 96009/1990 has been proposed by the inventor of the present invention. This drag unit has a structure comprising a first unit in which first braking adjusting plates and first intermediate bodies are alternately fixed on a rotary axis, both of which have a disc-like shape; a second unit in which ring-shaped second intermediate bodies and second braking adjusting plates are disposed coaxially with the first braking adjusting plates and the first intermediate bodies, respectively; and viscous fluid sealed between the first and the second units.

The second unit rotates with a tripod head when the tripod head is tilted. The rotation of the second unit causes viscous fluid to generate a viscous drag in relation to the first unit. This viscous drag can be used for a drag.

However, as is clear from the structure, the drag unit has a basic demerit in that the structure of the unit is extremely complicated.

The second demerit is that the size of a drag cannot be adjusted. Only a switchover of On and OFF states is realized. Since a photographing device has a wide variety of models and weights, it is expected that a more stable operation can be obtained if a drag can be adjusted to a suitable size, for example, according to the weight of the photographing device.

Further improvements have been desired on the drag unit for the tripod head.

This invention has an object to overcome those demerits of the conventional drag unit and to provide a drag unit for a tripod head having a simplified structure capable of applying a drag to the tripod head during a panning and a tilting movements of a photographing device such as a camera, a video camera and a movie camera, and also capable of adjusting the size of the drag.

These and other objects, features and advantages of the invention will become more apparent upon reading of the following detailed specification and accompanied drawings.

SUMMARY OF THE INVENTION

In order to solve the forgoing problems, a drag unit of the present invention is provided with a case; a drag disc disposed in the inner portion of this case; a hollow axis supporting these case and drag disc coaxially, a pair of long holes being formed at a side of the axis; a lid of the case; viscous fluid sealed between these case and lid; and a sliding axis having a pin connected to the drag disc, the pin being inserted into the inner portion of the axis and piercing the long holes of the axis so that the pin can slide along the long holes. Either of the case or the drag disc is connected to a tripod head so as to rotate with rotation of the tripod head.

The case is provided on its inner bottom surface with a plurality of first projections disposed coaxially. A plurality of first grooves are formed coaxially both between the first projections and between the outermost first projection and the inner side surface of the case. On the other hand, the drag disc is provided on its bottom surface with a plurality of second projections disposed coaxially to be inserted into the first grooves of the case. A first through hole is formed which pierces the second projection from the bottom to the top. In addition, a plurality of second grooves into which the first projections of the case are inserted are formed coaxially between the second projections. A second through hole is formed in the second groove and pieces the second groove from the bottom to the top.

This structure permits the viscous fluid sealed between the lid and the case to freely flow through the first and second through holes formed in the second projection and groove of the drag disc. This enables the sliding axis to slide along the inner surface of the axis and also enables the drag disc to move along the axis in the case.

When the drag disc is moved in the direction of the bottom of the case, some of the viscous fluid having an excessive bulk larger than the capacity between the case and the drag disc overflows toward the lid through the first and second through holes of the drag disc. The second projections of the drag disc are inserted into the first grooves of the case and, concurrently, the first projections of the case into the second grooves of the drag disc. Side surfaces of these first and second projections come closer to each other. When the tripod head is panned or tilted under this condition, a large size of viscous drag generates in the viscous fluid sealed between the first and second projections during rotation of either of the case or the drag disc and an increased drag is therefore applied to the tripod head.

On the other hand, when the drag disc is moved toward the lid, some of the viscous fluid having an excessive bulk larger than the capacity between the lid and the drag disc flows toward the case through those though holes. At this time, the side surfaces of the first and second projections are disposed apart from each other. The size of the viscous drag generating in the viscous fluid becomes smaller, thus causing a drag to decrease.

The drag unit of the present invention can apply a drag to a tripod head when the tripod head is panned or tilted, and can also adjust the size of the drag. It is possible to adjust the size in proportion to weight and other parameters of a photographing device such as a camera, a video camera and a movie camera mounted on the tripod head.

EMBODIMENTS

Figure 1:
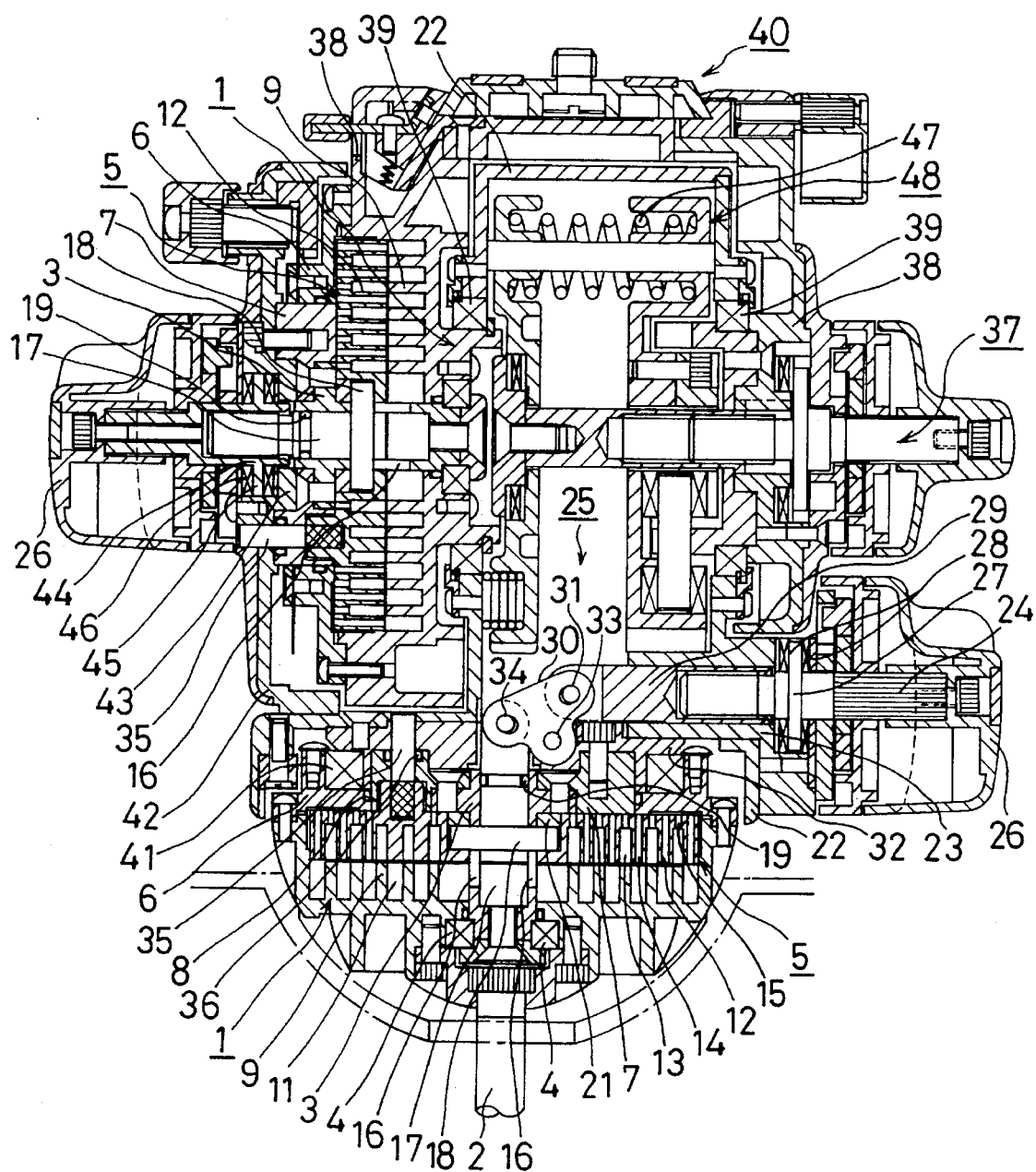
FIG. 1 is a cross section view depicting one embodiment of a drag unit for a tripod head.

Now, referring to the drawings depicting some embodiments, this invention will be further described in detail.

In an embodiment of FIG. 1, a drag unit which applies a drag to a tripod head when the tripod head is panned is provided at a lower portion of the tripod head to be fixed on a tripod.

A case 1 is disposed at a base portion of the tripod head. This case 1 is connected to a rotary shaft 2 as a center of the panning rotation of the tripod head. An axis 3 formed into a hollow shape is disposed coaxially with the rotary shaft 2. This axis 3 is rotatably connected to a lower portion of the case 1 through a bearing 4. A drag disc 5 is slidably disposed on the axis 3. This drag disc 5 can move upward and downward along the axis 3. The drag disc 5 is also supported by the axis 3 coaxially with the case 1.

A holder 6 and a bearing 7 are provided as a lid on a top surface of the case 1. The holder 6 and the bearing 7 are disposed coaxially with the axis 3, respectively. The holder 6 is located on the outside of the bearing 7 and is fixed on the case 1. This fixing is achieved by connection of a flange provided on the outer surface of a lower end of the holder 6 with a flange provided on the outer surface of an upper end portion of the case 1. An O ring 8 is inserted as a sealing member between the holder 6 and the bearing 7. The bearing 7 is closely fixed on an upper end portion of the axis 3 with a screw so that a sealed space is formed between the case 1 and the lid consisted of the holder 6 and the bearing 7. The sealed space is filled with grease or other viscous fluid and the aforementioned drag disc 5 is disposed in this sealed space.

Figure 2:
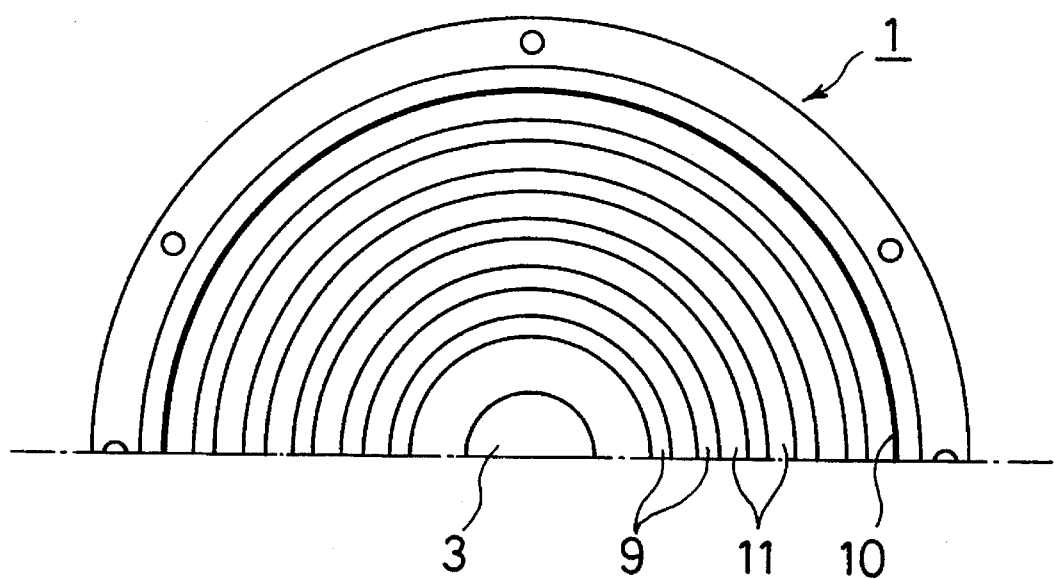
FIG. 2 is a partial plan view of an inner bottom surface of a case as shown in FIG. 1.

As illustrated in FIG. 2, a plurality of ring-shaped projections 9 disposed coaxially with the axis 3 are provided as first projections on an inner bottom surface. Grooves 11 disposed concentrically around the axis 3 are formed both between these projections 9 and between an outermost projection 9 and an inner side surface 10 of the case 1.

Figure 3A:
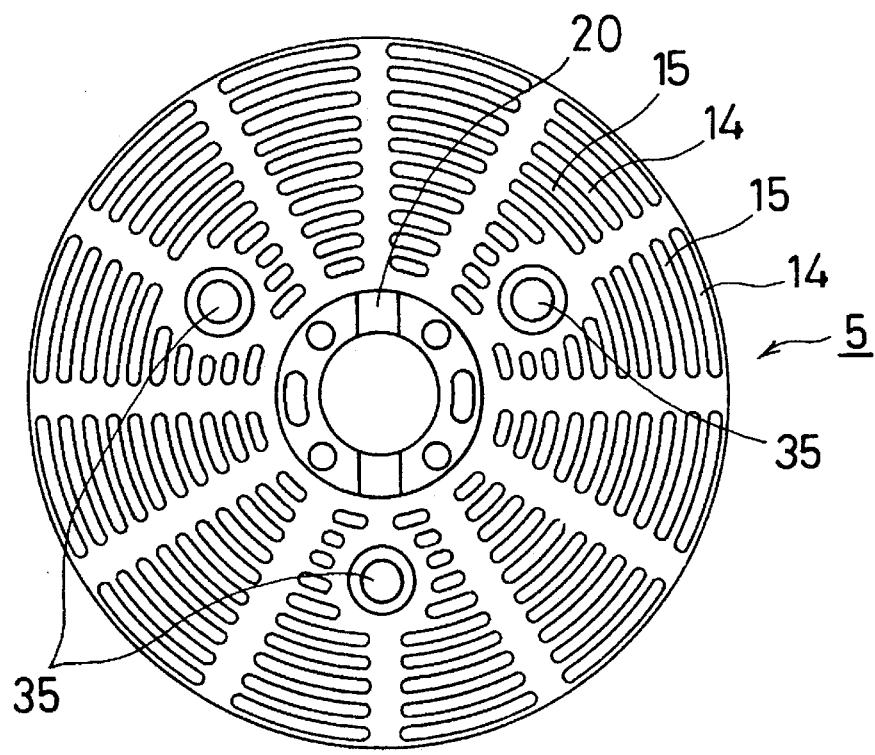
FIGS. 3A and 3B are plan views illustrating a top and a bottom surfaces of a drag unit as shown in FIG. 1.
Figure 3B:
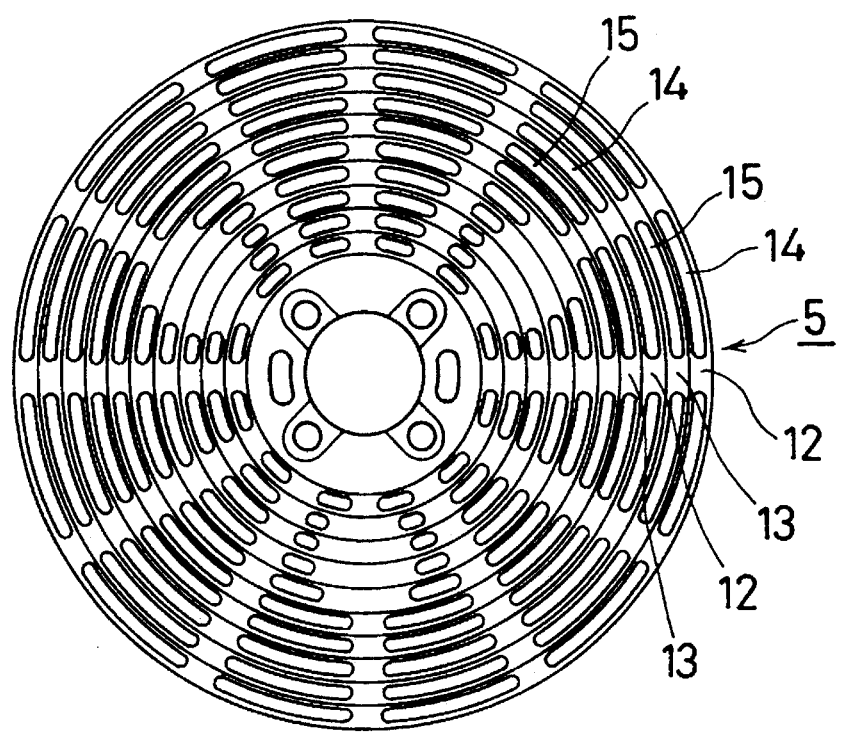

On the other hand, the drag disc 5 as illustrated in FIG. 1 is provided with a plurality of projections 12 as second projections. These projections 12 are disposed corresponding to locations of the grooves 11 of the case 1 and are insertable into those grooves 11. Grooves 13 are formed as second grooves corresponding to locations of the projections 9 are insertable into these grooves 13. Such the drag 5 is depicted in FIGS. 3A and 3B.

The projection 12 have a ring-like shape corresponding to the shape of the grooves 11 of the case 1 of FIG. 2. These projections 12 are also disposed coaxially with the axis 3. The manners as in the above are taken to the grooves 13. The grooves 13 are disposed corresponding to locations of the projections 9 of the case 1 and concentrically around the axis 3.

A through hole 14 piercing the projection 12 from the bottom to the top is formed as a first through hole. A through hole 15 piercing the groove 13 from the bottom to the top is formed as a second through hole. These through holes 14 and 15 are formed into an arc shape along the projection 12 and the groove 13, respectively. This results in the through holes being disposed coaxially with the support axis 3. The through holes 14 and 15 serve as flow paths of the viscous fluid sealed in the sealed space between the holder 6, bearing 7 and the case 1 as shown in FIG. 1. The viscous fluid can flow upward and downward in the sealed space through these through holes 14 and 15. This permits the drag disc 5 to slide upward and downward along the axis 3, although the viscous fluid is sealed.

A pair of long holes 16 opposite to each other are formed on a side surface of the axis 3 in which a sliding axis 17 is inserted. This sliding axis 17 is slidable along an inner surface of the axis 3. A pin 18 is provided for the sliding axis 17 on one of its tip portions. An O ring 19 is provided at an outer surface of the sliding axis 17, causing the sliding axis 17 to come into close contact with the inner surface of the axis 3.

The pin 19 protrudes from the long holes 16 of the axis 3 and is connected to the drag disc 5. The connection can be achieved by, for instance, placing the pin 18 in a recess 20 as shown in FIG. 3A in the vicinity of the center of the drag disc 5, placing a fixing plate 21 on the pin 18 and fixing the fixing plate 21 on the drag disc 5 with a fixing member such as a screw. Since the drag disc 5 is connected to the sliding axis 17 by the pin 18, a sliding movement of the sliding axis 17 can cause the drag disc 5 to slide along the axis 3. The converting distance of the drag 5 along the axis 3 corresponds with the sliding distance of the sliding axis 17 and is defined within the range of the length of a pair of long holes 16 formed on the side surface of the axis 3.

The other tip portion of the sliding axis 17 is connected through a transmission mechanism 25 to a rotary shaft 24 rotatably inserted into the inside of a fixed shaft 23. This fixed shaft 23 has a hollow shape and is fixed on a side portion of a longitudinal axis 22 of the tripod head. An operation knob 26 is provided with the rotary shaft 24 at one end thereof. A screw portion is formed on an outer surface of the other end of the rotary shaft 24, but does not move fore and aft. A disc 27 is coaxially mounted on the rotary shaft 24 and is inserted between bearing 28 fixed coaxially with the fixed shaft 23.

A tube 29 is inserted between the rotary shaft 24 and the fixed shaft Z3 and is slidable in the direction of its length. An inner surface of one end of the tube 29 is formed into a screw, being engaged with the screw portion of the rotary shaft 24. Rotation of the operation knob 26 causes the rotary shaft 24 to rotate and causes the tube 29 to slide because of an engagement of those screw portion. A drag operating plate 30 is rotatably connected through a shaft 31 to the other end of the tube 29.

A center portion of the drag operating plate 30 is connected through a shaft 33 to a top portion of a fixing plate 32 for fixing the bearing 7 on the longitudinal axis 22. The fixing plate 32 is disposed at a bottom portion of the longitudinal axis 22. The drag operating plate 30 is also rotatably connected through a shaft 34 to the sliding axis 17. It is clear from the above that the drag operating plate 30 is rotatably supported on three points and that the tube 29 and the sliding axis 17 are connected with each other by the plate 30. Three openings are formed on the drag operating plate 30, two of which the shafts 31 and 34 are inserted into are formed into an ellipse-like shape.

In such a transmission mechanism 25, when rotation of the operation knob 26 causes the rotary shaft 24 to rotate, the rotary motion is converted into the sliding motion of the tube 29. Then, the sliding motion of the tube 29 causes the drag operating plate 30 to rotate around the shaft 33. The opening into which the shafts 31 and 34 are inserted are so an ellipse-like shape that the drag operating plate 30 rotates smoothly.

The sliding axis 17 is pushed down by the drag operating plate 30 during its rotation. Consequently, the rotary motion of the operation knob 26 is converted into a vertical motion of the sliding axis 17. According to this, an operation of the operation knob 26 provided on the side surface of the tripod head can cause the drag disc 5 to move upward and downward in the case 1.

In FIG. 1, a guide pin 35 extending upward is provided on an upper portion of the drag disc 5 so as to ensure a stable vertical motion of the drag disc 5. A through hole is formed on the bearing 7, fixing plate 32 and a bottom portion of the longitudinal axis 22, respectively. These through holes are disposed corresponding to location of the guide pin 35. The guide pin 35 is movably inserted into each of these through holes and can move along inner surfaces of them. An O ring 36 is provided as a sealing member on an upper portion of the through hole of the bearing 7 to maintain a sealing property and prevent the viscous fluid from leaking. The guide pin 35 can be provided, for example, at three points of the top portion of the drag disc 5, as shown in FIG. 3A.

As further depicted in FIG. 1, a horizontal axis 37 is provided with the tripod head which is a center during a tilting movement. A strut 38 tiltable around the horizontal axis 37 is connected through a bearing 39 to the longitudinal axis 22. On the top of this strut 38, a sliding plate device 40 is provide for mounting a photographing device such as a camera, a video camera and a movie camera.

A bearing 41 is disposed between the fixing plate 32 and the holder 6. The longitudinal axis 22 can rotate with the strut 38 around the rotary shaft 2 and therefore it is possible to pan a photographing device mounted on the sliding plate device 40.

The drag unit described in the above plays a role during a panning movement as follows:

The case 1 and the holder 6 do not rotate because both of them are fixed. On the other hand, when the longitudinal axis 22 rotates with the strut 38 in the horizontal plane, the fixing plate 32, the bearing 7 and the axis 3, in turn, rotate with rotation of the longitudinal axis 22. This is because the bearing 7 is fixed on the longitudinal axis 22 through the fixing plate 32 and the axis 3 is fixed on the bearing 7. The sliding axis 17 inserted into the inside of the axis 3 comes into close contact with the inner surface of the axis 3 via the 0 ring 19. The fixed shaft 23 into which the rotary shaft 24 is inserted is fixed on the longitudinal axis 7. Consequently, the sliding axis 17 also rotates with the axis 3 integratedly. These rotations enable the drag disc 5 connected to the sliding axis 17 to rotate when the tripod head is panned.

Viscous drag generates in the viscous fluid sealed between the projections 12 of thus rotating drag disc 5 and the projections 9 of the fixed case 1, acting as a drag against the panning movement.

In such a state as shown in FIG. 1, since the projections 12 of the drag disc 5 are not inserted into the grooves 11, nor are the projections 9 on the case 1 inserted into the grooves 13 of the drag disc 5, in other words, the case 1 and the drag disc 5 do not engage with each other, only a little viscous drag generates in the viscous fluid even when the drag disc 5 rotates with the horizontal rotation of the longitudinal axis 22. This allows the tripod head to be rotated with small torque and at a high speed.

Figure 4:
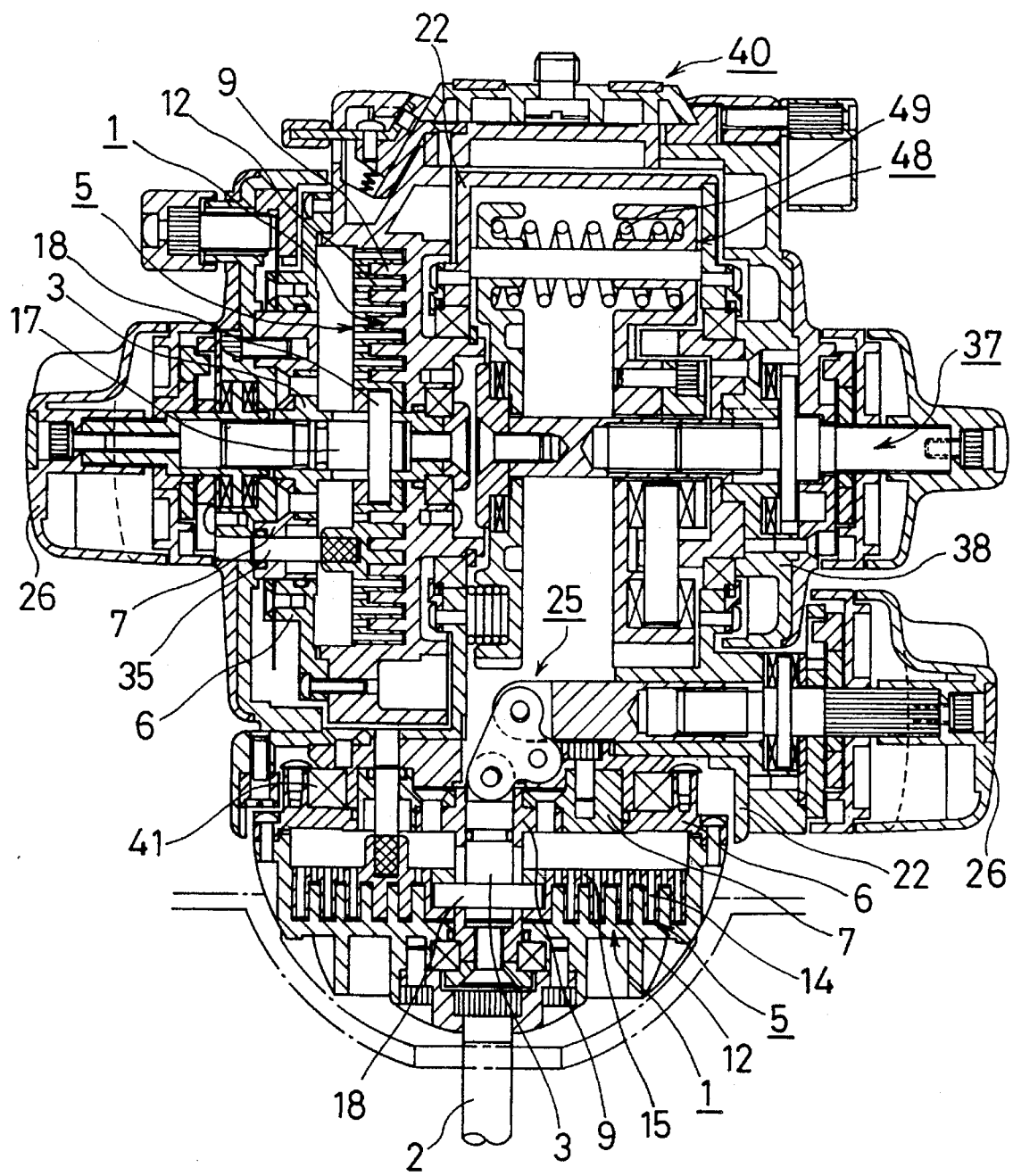
FIG. 4 is a cross section of another state of an embodiment as shown in FIG. 1.

In such a state as shown in FIG. 4, on the other hand, when rotation of the operation knob 26 causes the sliding axis 17 to move down through the transmission mechanism 25, some of the viscous fluid having an excessive bulk larger than the capacity between the case 1 and the drag disc 5 flows upward through the through holes 14 and 15 formed on the projections 12 and the grooves 11 of the drag disc 5. The projections 12 of the drag disc 5 are inserted into the grooves 11 of the case 1 and, concurrently, the projections 9 on the case 1 are inserted into the grooves 11 of the drag disc 5, bringing about a close contact of these projections 12 and 9. In other words, the case 1 and the drag disc 5 engage with each other. Under this condition, when the tripod head is panned around the rotary shaft 2, rotation of the drag disc 5 causes the projections 12 to rotate, generating a large size of viscous drag in the viscous fluid between the projections 12 and 9. A large size of a drag can be applied to the tripod head during a panning movement. A large size of torque is applied to pan the tripod head in this condition. The tripod head is panned under the effect of the drag and its panning speed becomes slow.

When the drag disc 5 is placed at an intermediate state between these states as shown in FIGS. 1 and 4, the drag is controlled according to the state. This makes it possible to adjust a drag continuously between the maximum and minimum values. The panning speed of a photographing device can be controlled at a prescribed one. Operational stability of the photographing device can be improved.

As is clear from the structure described in the above, the structure is much simpler than the conventional one. The number of parts are therefore decreased. These pay off reducing a cost of the drag unit.

In FIG. 1, a drag unit for a tilting movement is further provided for the tripod head.

This drag unit is disposed around the longitudinal axis 37 as a center of a tilting movement, but the structure of this unit is almost equal to that of the drag unit for a panning movement except minor differences as follows:

In the drag unit for the tilting movement, a case 1 is rotatably connected to the longitudinal axis 22 through the bearing 39. The longitudinal axis 22 defining the horizontal axis 37 rotates in the horizontal plane, but it cannot rotate in the vertical plane.

The strut 38 is integratedly connected to an upper portion of the case 1. This permits the case 1 to rotate with the strut 38 around the horizontal axis 37. Consequently, a holder 6 fixed on the case 1 can rotate integratedly.

A bearing 7 forming a lid with the holder 6 is fixed on a casing 42 forming a side portion of the tripod head and it is disposed coaxially with the horizontal axis 37. An axis 3 fixed to this bearing 7 is therefore incapable of rotating. A sliding axis 17 does not rotate but slides along an inner surface of the axis 3. Consequently, a drag disc 5 does not rotate but slides along the axis 3 because it is connected to a pin 18 fixed on a tip portion of the sliding axis 17.

A guide pin 35 projecting from the drag disc 5 is inserted into a through hole formed on the casing 42. The through hole of the casing 42 guides sliding movement of the guide pin 35 together with a through hole of the bearing 17. This ensures movement of the drag disc 5.

A fixed shaft 43 is disposed coaxially with the horizontal axis 37 and a rotary shaft 44 is inserted into the inside of the fixed shaft 43. This rotary shaft 44 is mounted with an operation knob 26 on its tip portion. A disc 45 is provided coaxially with the rotary shaft 44 and is inserted into a bearing 46 disposed on the casing 42. This disc 45 is also disposed coaxially with the horizontal axis 37.

The rotary shaft 44 is formed into a hollow shape with a screw portion on its inner surface. One end of the sliding axis 17 opposite to the pin 18 is also formed into a screw portion which engages with the screw portion of the rotary shaft 44. The sliding axis 17 is directly connected to the rotary shaft 44 through these screw portions.

In this structure, when the operation knob 26 is rotated, rotation of the rotary shaft 44 accompanied by the rotation of the knob 26 is converted through the screw portions directly into sliding movement of the sliding axis 17 in the direction of the horizontal axis 37.

As is understood from the above, a drag derived from the drag unit for the tilting movement acts on the tripod head in the same way as in the drag unit for the panning movement.

In the state of FIG. 1, even if the strut 38 is tilted so as to rotate the case 1, only a little viscous drag generates in the viscous fluid because the case 1 and the drag disc 5 do not engage with each other. Consequently, the tripod head can be tilted with even small torque and at a high speed.

On the other hand, when rotation of the operation knob 26 causes the drag disc 5 to engage with the case 1 as shown in FIG. 5 and the tripod head is tilted under this condition, rotation of the drag disc 5 results in generating a large size of viscous drag in the viscous fluid between side surfaces of the projections 9 and 12 provided on each of the case 1 and the drag disc 5. A large size of a drag acts on the tripod head. Large torque is required to tilt the tripod head. The tripod head is tilted under the effect of the drag and its tilting speed becomes slow. The tilting speed of a photographing device to be mounted on the sliding plate device 40 can be controlled continuously. The structure of the unit is simplified.

Further, a counterbalancing unit 48 is provided for the tripod head in which coil springs 47 are disposed coaxially with the horizontal axis 37. The drag unit acts a drag on righting moment generated by the counterbalancing unit 48 according to elastic force of the coil springs 47 so as to remove the tripod head to the initial position. This prevents the tripod head from rapidly removing and ensures operational safety.

According to the present invention, when a photographing device such as a camera, a video camera and a movie camera is panned and tilted, a controlled drag is applied to the tripod head. The size of the drag is adjustable, for example, corresponding to a motion and weight of the photographing device. The structure of the drag unit is simplified and therefore it is possible to reduce a cost.

The present invention is not restricted to the aforestated examples. It is needless to say that various modifications of the structure of the tripod head are possible.

What is claimed is:

1. A drag unit for a tripod head comprising a case having on an inner bottom surface thereof a plurality of first projections disposed coaxially and having a plurality of first grooves formed coaxially both between said first projections and between an outermost first projection and an inner side surface of said case; a drag disc having on a bottom surface thereof a plurality of second projections disposed coaxially to be inserted into said first grooves of the case, said drag disc also having a first through hole piercing said second projection from a bottom to a top thereof and a plurality of second grooves formed coaxially between the second projections into which the first projections of the case are inserted, said drag disc further having a second through hole piercing said second groove from a bottom to a top thereof; an axis formed into a hollow shape and supporting said case and drag disc coaxially, a pair of long holes being formed at a side of said axis; a lid fixed on the case; viscous fluid sealed between said case and lid; and a sliding axis having a pin connected to the drag disc, said pin being inserted into an inner portion of the axis and piercing said long holes of the axis so that said sliding axis slides along an inner surface of the axis; wherein either of the case or drag disc is connected to a tripod head so as to rotate with rotation of said tripod head.

2. A drag unit as claimed in claim 1, wherein the pin is fixed on one end of said sliding axis, and an operation knob is connected with the other end of the sliding axis through a transmission mechanism which converts rotation of said operation knob into sliding movement of the sliding axis, said operation knob being rotatably disposed around a rotary axis provided for said tripod head.

3. A drag unit as claimed in claim 1, wherein a guide pin projecting upward from a top surface of the drag disc is provided for the drag disc, the lid is provided with a through hole piercing the lid from a bottom to a top surface, and a sealing member is disposed on an inner surface of said through hole, said guide pin being inserted into the through hole of the lid.

\* \* \* \* \*